United States Patent [19]

Hatano

[11] Patent Number: 4,758,075
[45] Date of Patent: Jul. 19, 1988

[54] METHOD OF COLOR SEPARATION IN COLOR PHOTOGRAPHING OR PRINTING AND TRICHROMATIC SEPARATION FILTER

[75] Inventor: Hideo Hatano, Machida, Japan

[73] Assignee: Asanuma Camera Mechanical Laboratory & Co., Ltd., Ebina, Japan

[21] Appl. No.: 888,177

[22] Filed: Jul. 22, 1986

[51] Int. Cl.⁴ .............................................. G02B 5/20
[52] U.S. Cl. .................................... 350/439; 350/317
[58] Field of Search ................................ 350/439, 317

[56] References Cited

U.S. PATENT DOCUMENTS 2,460,507  2/1949  Johnston ............................ 350/439
4,256,372  3/1981  Yasukuni et al. .................... 350/439
4,588,266  5/1986  Komoto ............................. 350/439

Primary Examiner—John K. Corbin
Assistant Examiner—Rebecca D. Gass
Attorney, Agent, or Firm—Schwartz & Weinrieb

[57] ABSTRACT

The color separating method for color photographing or printing is such that in case a color photosensitive material is used and the color separation is carried out by the color separating method, three kinds of filters consisting of three primary colors are caused to be sequentially or selectively disposed upon or removed from the optical axis of a light condensing unit in a lens group consisting of a large number of lenses of an optical system, and white light conducted from one end of the lens group is made to project the separated color component at the other end. The three filters are disposed upon a rotary filter support board which is selectively rotated by a control motor and a controller for the control motor which receives input control signals from a suitable source and outputs control signals to the control motor.

18 Claims, 3 Drawing Sheets

METHOD OF COLOR SEPARATION IN COLOR PHOTOGRAPHING OR PRINTING AND TRICHROMATIC SEPARATION FILTER

FIELD OF THE INVENTION

This invention relates to a method of color separation in color photography or printing and a trichromatic separation filter therefor.

BACKGROUND OF THE INVENTION

Heretofore, in the field of photography or printing by means of a trichromatic separation system using photosensitive color material such as, for example, an RGB analog, RGBTTL, a composite video signal (NTSC) or the like, there is conventionally employed a filter device which inserts filters of the three primary colors, blue, green and red onto the optical axis of a lens group for a predetermined time depending upon the kind or type of original plate or the quality of the photosensitive material, however the filter device of this kind, as shown in FIG. 7, comprises a structure in which a filter 52 is disposed along the optical axis 51 at a position exterior of the lens group 50.

More particularly, a conventional filter 52 was inserted into a diffused light portion along an optical axis 51 so that its aperture $\phi_1$ is substantially large whereby miniaturization of the associated equipment was difficult to achieve and the response characteristics with respect to the system operation was poor, and also, since it was a separate body from the lens group 50, an exchange of the filter was troublesome which was another disadvantageous problem. Moreover, since the filter 52 was disposed exteriorly of the lens group 50, there were additional problems wherein the filter 52 was directly exposed to the external atmosphere which may contain poisonous gases, fumes or moisture and the like, whereby the filter 52 became deteriorated by means of the foregoing adverse conditions.

OBJECT OF THE INVENTION

This invention has been made in view of the foregoing problems, and an object of this invention is to provide a novel color separating method in color photography or printing which has eliminated the filter exchange problem and to provide a trichromatic separation filter for miniaturizing the device and improving the response characteristics during the operation mode and for achieving the unitary construction with the lens group. In addition, an object of this invention is to provide a trichromatic color separation filter which will provide the necessary filter functions to achieve the above objectives.

SUMMARY OF THE INVENTION

The color separating method for color photography or printing of this invention is such that in case a color photosensitive material is used and the color separation is carried out by means of the color separating method, three kinds of filters consisting of three primary colors are adapted to be disposed upon or removed from an optical axis of a light condensing unit in a lens group consisting of a large number of lenses of an optical system, whereby white light conducted from one end of the lens group is made to project the separated color component at the other end, and as its structure, in the lens group of the optical device such as, for example, a color camera or the printing device for color separation by the color separating method using the color photosensitive material, a trichromatic separation filter is constructed in such a way that a filter support board in which filters for trichromatic separation are disposed around an optical axis of the light condensing unit in the lens group is rotatably disposed so as to sequentially present the filters to the optical axis, and the filter support board is rotatably driven by means of an electrical control motor. Also, a filter may be exchanged with a shutter by disposing filters for trichromatic separation around the axis of the filter support board and disposing a shutter portion consisting of at least one light shielding portion at a filter position such that the filters and shutter are equiangularly disposed about the rotary axis of the filter support board.

According to the color separating method for the color photography or printing, since the filters are disposed upon the optical axis of the light condensing unit of the lens group, the effective diameter of each filter can be formed as a relatively small diameter, and accordingly, the filter device including the filter support board can be miniaturized. Also, when the filter support board is miniaturized, the necessary turning moment becomes small, and as a result, the response characteristics during the operation mode is improved. Also, in view of the fact that the filter support board is provided in the lens group in addition to the miniaturization, a filter assembly integral with the lens can be easily provided, and as the filters are not exposed to ambient light and atmosphere, the filters are free from being exposed directly to the external atmosphere which may include poisonous gases, fumes or moisture and the like, and the filters can therefore be stably used for a long period of time.

Various other objects, features, and attendant advantages of the present invention will become more apparent from the following detailed description, when considered in connection with the accompanying drawings, in which like reference characters designate like or corresponding parts throughout the several views, and wherein.

DETAILED DESCRIPTION OF THE PREFERRED EMBODIMENT

This invention will now be described in detail by referring to an illustrated embodiment of this invention.

Figure 1:
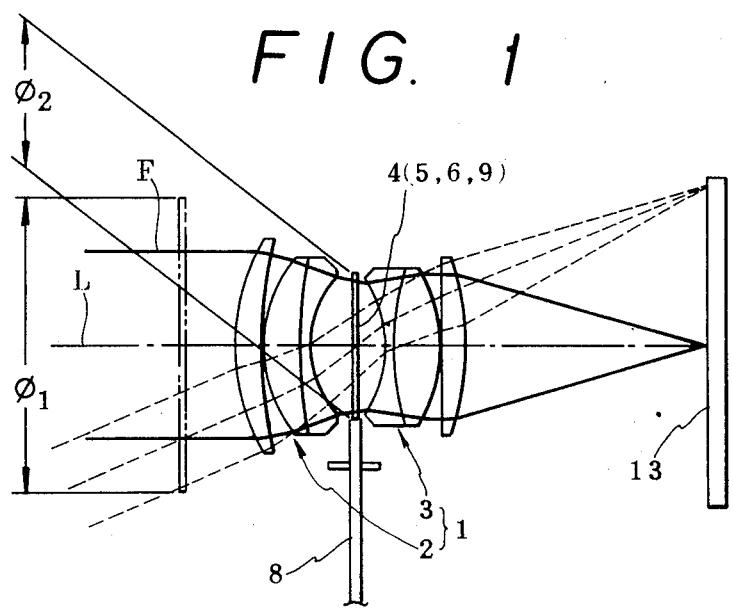
FIG. 1 is an explanatory drawing of a lens system showing the operative principle of the color separating method in a color photography or printing system in accordance with the present invention.
Figure 2:
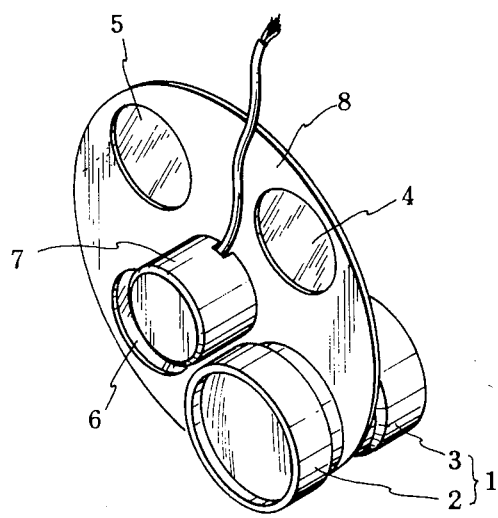
FIG. 2 is a perspective view of a filter support board or trichromatic separation filter of the present invention.
Figure 3:
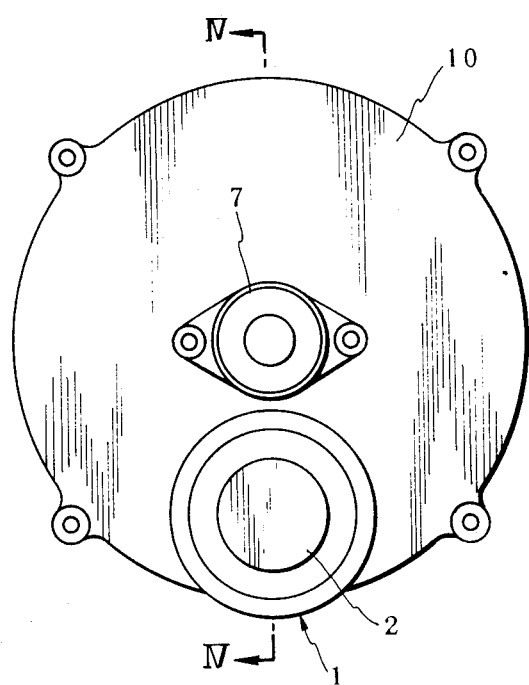
FIG. 3 is a front elevation view of the combination lens and filter system of the present invention.
Figure 4:
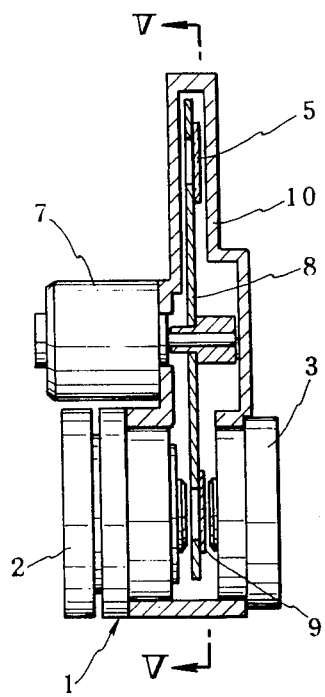
FIG. 4 is a cross-sectional view of the system of FIG. 3 taken along the line IV—IV of FIG. 3.
Figure 5:
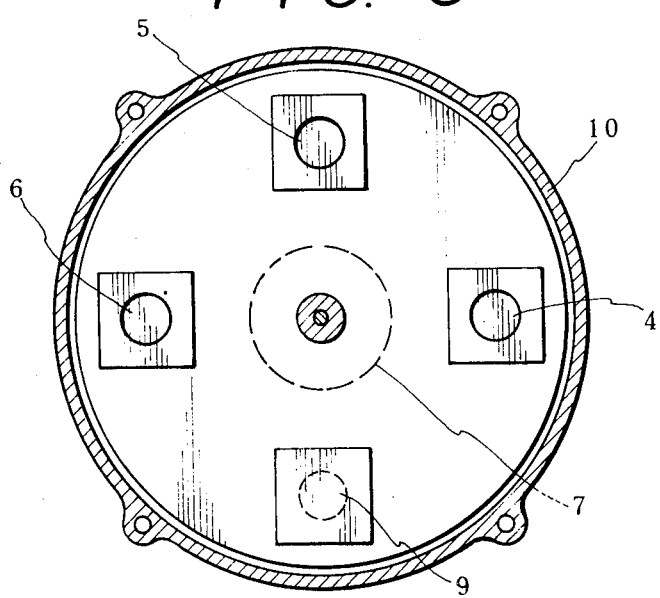
FIG. 5 is a cross-sectional view of the system of FIG. 4 taken along the line V—V of FIG. 4.

The method of this invention will be described by referring to the drawings in which, FIG. 1 shows a lens system 1 illustrating a principle of this invention. The lens system is of the 2-group-6-piece type, and filters 4, 5, 6 are selectively interposed between lenses of the first lens group 2 and the second lens group 3 which are arranged serially on the optical axis L, and each filter 4, 5, 6 has an effective diameter $\phi_2$ which covers the largest area of the incident light F. The effective diameter $\phi_2$ has a smaller diameter than the diameter $\phi_1$ of the area of the incident light F shown by the two-point chained line. Accordingly the incident light F entering the first lens group 2 from the left side in FIG. 1 passes through one of the filters 4, 5, 6 positioned within the light condensing unit between the first lens group 2 and the second lens group 3, and is color separated, and then, forms an image upon the light condensing surface through means of the second lens group 3.

The filters 4, 5, 6 are composed of a blue filter 4, green filter 5 and red filter 6 which are disposed around an axis of a disc type filter support board 8 which is pivotablly fixed upon the shaft of a control motor 7, as shown in FIGS. 2 through 5, and which also includes a shutter plate 9 whereby each color filter 4, 5, 6 and the light shielding material of shutter plate 9 is disposed so as to be coincident or concentric with the optical axis L. The filter support board 8 is housed in a hollow disc type housing 10, a control motor 7 is coaxially mounted upon one end of the housing 10, and the first lens group 2 and the second lens group 3 having the optical axis L in common with respect to each other on one peripheral portion of the housing 10 are fixed to both surfaces respectively, whereby the lens system 1 is formed by means of the filter support board 8 being disposed within the hollow portion of the housing 10. The trichromatic separation filters having the foregoing construction are therefore adapted to sequentially color separate the incident light as a result of the selective disposition of the filters by means of the control and drive of the control motor 7 by means of a suitable controller, and an example of a control system as applied to the color hard copy copying device is described below.

Figure 6:
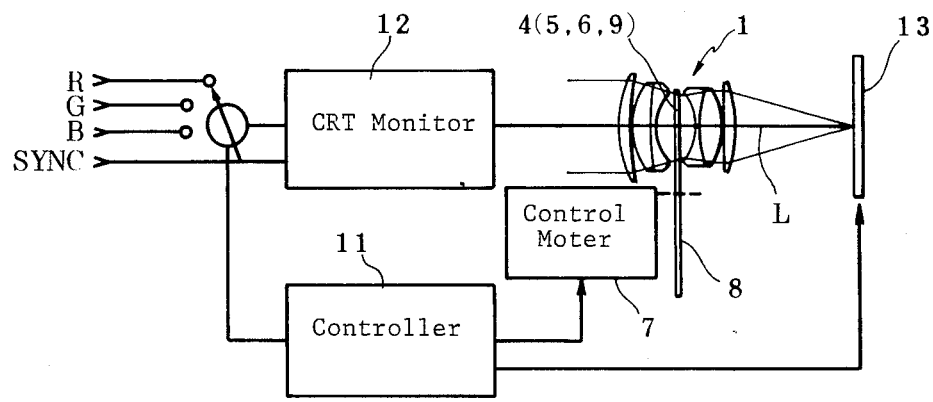
FIG. 6 is a block diagram of a color hard-copy copying system utilizing the filter system of the present invention.
Figure 7:
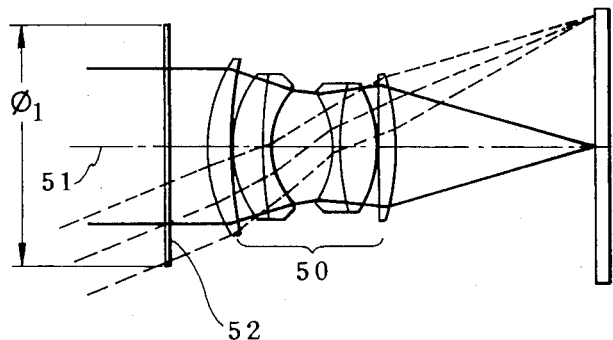
FIG. 7 is an explanatory drawing, similar to that of FIG. 1, showing however a lens and filter system characteristic of the prior art color photography or printing apparatus.

FIG. 6 is a block diagram showing a construction of the color hard copy copying device, and when a print switch of the device is pressed, a controller 11 rotatably drives the control motor 7 and removes the shutter plate 9 from the optical axis L of the lens system 1, and R, G, B signals are sequentially changed over and selected from R, G, B input signals, and an image is projected on a monochromatic flat face CRT monitor 12 for a predetermined time. At the same time, since the filter support board 8 provided with the blue filter 4, green filter 5 and red filter 6 is rotated by means of the control motor 7, the image on the flat face CRT monitor 12 is superimposed upon a piece of color film 13 by means of each color filter 4, 5, 6 and is exposed to the light so as to produce a color photograph.

After the photography is completed, the flat face CRT monitor 12 is turned OFF, the shutter plate 9 provided on the filter support board 8 is made to stop at a position corresponding to the optical axis L of the lens system 1, and the color film 13 is automatically developed so as to be fed out.

As described in the foregoing, not only can a color hard-copy copying device employ the principles of the present invention but also, the color separating method can be employed in color photography or printing and the trichromatic separation filter can be used in all optical systems for photography or printing by the trichromatic separating system using color photosensitive material, and can also be utilized in the color separation of various signals such as RGB analog, RGB TTL, and composite video signal (NTSC) and the like.

As described in the foregoing, the color separating method of this invention for color photography of printing and the trichromatic separation filter can be practiced and formed in such a way that since the filters are inserted at positions upon the optical axis of the light condensing unit of the lens group, an effective diameter of each filter can be formed as a relatively small diameter, and as a result, the device can be miniaturized. Also, the diameter of the filter support board becomes small as a result of miniaturization of the device, and the response characteristics during the operation mode accompanied by the turning moment can be improved.

According to this invention, since the filter support board can be provided in the lengs group simultaneously with the miniaturization thereof, an assembly integrated with the lens can be easily produced, and its attachment to other pieces of equipment becomes simple, and as the filters are not exposed to the external atmosphere or environment, the filters are free from the direct exposure to the external atmosphere which may contain poisonous gases, fumes or moisture and the like, and the filters can be stably maintained for a long period of time. Moreover, since the shutter portion is integrally formed with the filter support board, the compactness of the construction can be achieved, and as a result, the practical effect as a result of the practice of this invention is extremely large.

What is claimed is:

1. A trichromatic separation filter system for color separation in color photography, printing, or the like, comprising:
    first lens means for receiving and transmitting incident light;
    second lens means axially separated from said first lens means along an optical axis defined by said first and second lens means for receiving and transmitting light transmitted to said second lens means from said first lens means;
    filter support means rotatably interposed between said first and second lens means about an axis of rotation for supporting three primary color filters at predetermined radial positions upon said support means such that when said support means is rotated about said axis of rotation to any one of several predetermined angular positions, at least one of said filters will be coaxially aligned with said optical axis of said first and second lens means;
    motor means for rotatably driving said rotatable filter support means to one of said predetermined angular positions;
    means for generating color separation control input signals; and
    control means for receiving said control input signals and for generating control output signals to said motor means for driving said motor means which, in turn, rotatably drives said filter support means so as to selectively dispose a particular one of said three filters upon said optical axis of said first and second lens means.

2. A system as set forth in claim 1, further comprising:
    shutter means disposed upon said filter support means at a predetermined radial position such that when said support means is rotated about said axis of rotation to another predetermined angular position, said shutter means will be coaxially aligned with said optical axis of said first and second lens means.

3. A system as set forth in claim 2, wherein:
said three filters and said shutter means are equiangularly disposed upon said rotatable filter support means about said axis of rotation.

4. A system as set forth in claim 1, wherein:
each of said first and second lens means comprises three lens components disposed along said optical axis.

5. A system as set forth in claim 1, wherein:
said axis of rotation of said filter support means is disposed parallel to said optical axis of said first and second lens means.

6. A system as set forth in claim 1, wherein:
said first and second lens means, and said filter support means, are disposed within a common housing.

7. A trichromatic separation filter system for color separation in color photography, printing, or the like, comprising:
lens means, comprising at least two lens components axially separated from each other along an optical axis defined by said at least two lens components, for receiving and transmitting incident light;
filter support means rotatably interposed between said at least two lens components about an axis of rotation for supporting three primary color filters at predetermined radial positions upon said support means such that when said support means is rotated about said axis of rotation to any one of several predetermined angular positions, at least one of said filters will be coaxially aligned with said optical axis of said at least two lens components;
motor means for rotatably driving said rotatable filter support means about said axis of rotation to one of said predetermined angular positions;
means for generating color separation control input signals; and
control means for receiving said control input signals from said control input signal generating means and for generating control output signals to said motor means for driving said motor means so as to rotate said filter support means whereby a particular one of said three filters will be coaxially disposed upon said optical axis of said at least two lens components.

8. A system as set forth in claim 7, further comprising:
shutter means disposed upon said filter support means at a predetermined radial position such that when said support means is rotated about said axis of rotation to another predetermined angular position by said motor means, said shutter means will be coaxially disposed upon said optical axis of said at least two lens components.

9. A system as set forth in claim 8, wherein:
said three filters and said shutter means are equiangularly disposed upon said filter support means about said axis of rotation.

10. A system as set forth in claim 7, wherein:
said lens means comprises two groups of three lens components disposed along said optical axis.

11. A system as set forth in claim 7, wherein:
said axis of rotation of said filter support means is disposed parallel to said optical axis of said at least two lens components.

12. A system as set forth in claim 7, wherein:
said at least two lens components and said filter support means are disposed within a common housing.

13. A method of color separation in color photography, printing, or the like, comprising the steps of:
disposing at least two lens components at axially separated positions so as to define an optical axis therebetween;
causing incident light to pass through said at least two axially spaced lens components along said optical axis;
interposing a filter support means, having three primary color filters disposed thereon at predetermined radial positions and rotatable about an axis of rotation, between said at least two lens components such that when said filter support means is rotated about said axis of rotation to any one of several predetermined angular positions, at least one of said filters will be coaxially disposed upon said optical axis;
drivingly connecting a drive motor to said rotatable filter support means so as to rotate said filter support means about said axis of rotation to said one of said predetermined angular positions;
generating color separation control input signals; and
providing a control means for receiving said control input signals and for generating control output signals to said drive motor for rotating said filter support means to said one of said predetermined angular positions whereby a particular one of said three filters will be coaxially disposed upon said optical axis so as to achieve said color separation.

14. A method as set forth in claim 13, further comprising:
providing a shutter means upon said filter support means at a predetermined radial position such that when said support means is rotated about said axis of rotation to another predetermined angular position, said shutter means will be coaxially aligned with said optical axis of said lens components.

15. A method as set forth in claim 14, wherein:
said shutter means and said three filters are provided at equiangular positions upon said filter support means with respect to said axis of rotation.

16. A method as set forth in claim 13, wherein:
six lens components are arranged in two groups of three lens components each.

17. A method as set forth in claim 13, wherein:
said axis of rotation of said filter support means is provided so as to be disposed parallel to said optical axis.

18. A method as set forth in claim 13, further comprising:
providing said lens components and said filter support means in a common housing.

* * * * *